United States Patent
Stahlhut

(10) Patent No.: US 8,042,219 B2
(45) Date of Patent: Oct. 25, 2011

(54) WIPER ARM ASSEMBLY HAVING LOCKING SURFACES

(75) Inventor: Alan J. Stahlhut, Valparaiso, IN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 1001 days.

(21) Appl. No.: 11/926,344

(22) Filed: Oct. 29, 2007

(65) Prior Publication Data

US 2008/0098557 A1    May 1, 2008

Related U.S. Application Data

(60) Provisional application No. 60/863,445, filed on Oct. 30, 2006.

(51) Int. Cl.
*B60S 1/34* (2006.01)

(52) U.S. Cl. ............ 15/250.352; 15/250.351; 15/250.19

(58) Field of Classification Search ............. 15/250.351, 15/250.352, 250.31, 250.19
See application file for complete search history.

(56) References Cited

U.S. PATENT DOCUMENTS

| | | | |
|---|---|---|---|
| 3,729,767 A | 5/1973 | Edele et al. | |
| 4,170,804 A | 10/1979 | Scotcher | |
| 4,251,899 A | 2/1981 | Hoyler | |
| 4,564,971 A | 1/1986 | Pethers et al. | |
| 4,704,761 A | 11/1987 | South et al. | |
| 4,741,068 A | 5/1988 | Roth | |
| 4,991,251 A | 2/1991 | Egner-Walter et al. | |
| 5,079,793 A | 1/1992 | Isii | |
| 5,165,159 A | 11/1992 | Egner-Walter et al. | |
| 5,435,042 A | 7/1995 | Arai et al. | |
| 5,628,085 A * | 5/1997 | Edele et al. | ................. 15/250.32 |
| 6,223,778 B1 | 5/2001 | Bucher et al. | |
| 6,394,688 B1 | 5/2002 | Kraemer | |
| 6,553,608 B2 | 4/2003 | Kraus et al. | |
| 6,640,381 B1 | 11/2003 | Zimmer | |
| 6,658,691 B2 | 12/2003 | Muramatsu | |
| 6,782,581 B2 | 8/2004 | Block | |
| 2003/0110587 A1 | 6/2003 | Ritt | |
| 2004/0025282 A1 | 2/2004 | Zimmer et al. | |

FOREIGN PATENT DOCUMENTS

| | | |
|---|---|---|
| EP | 0755833 | 1/1997 |
| JP | 63017149 | 1/1988 |
| JP | 10129424 | 5/1998 |
| JP | 2001010450 | 1/2001 |
| JP | 2001080466 | 3/2001 |
| JP | 2004249823 | 9/2004 |
| JP | 2006240364 | 9/2006 |

* cited by examiner

*Primary Examiner* — Gary Graham
(74) *Attorney, Agent, or Firm* — Robert L. Stearns; Dickinson Wright PLLC

(57) ABSTRACT

A wiper arm assembly and method of construction thereof includes a mounting head and a wiper arm configured for relative rotation during assembly from a disassembled position to a shipping position, wherein the wiper arm and mounting head are locked against rotation toward the disassembled position once in the shipping position. The mounting head and wiper arm have locking surfaces configured for locked engagement with one another while in the shipping position. The locking surfaces are brought into engagement with one another by a force imparted by a spring while rotating the mounting head relative to the wiper arm from the disassembled position toward the shipping position. When in the shipping position, the locking surfaces confront each other and prevent the mounting head and the wiper arm from rotating back toward the disassembled position from the shipping position.

6 Claims, 6 Drawing Sheets

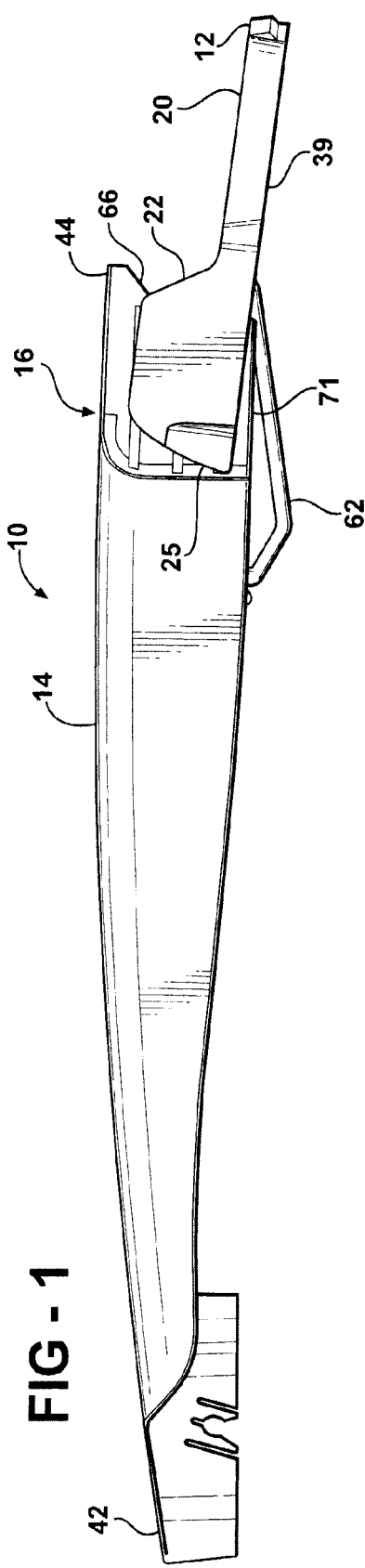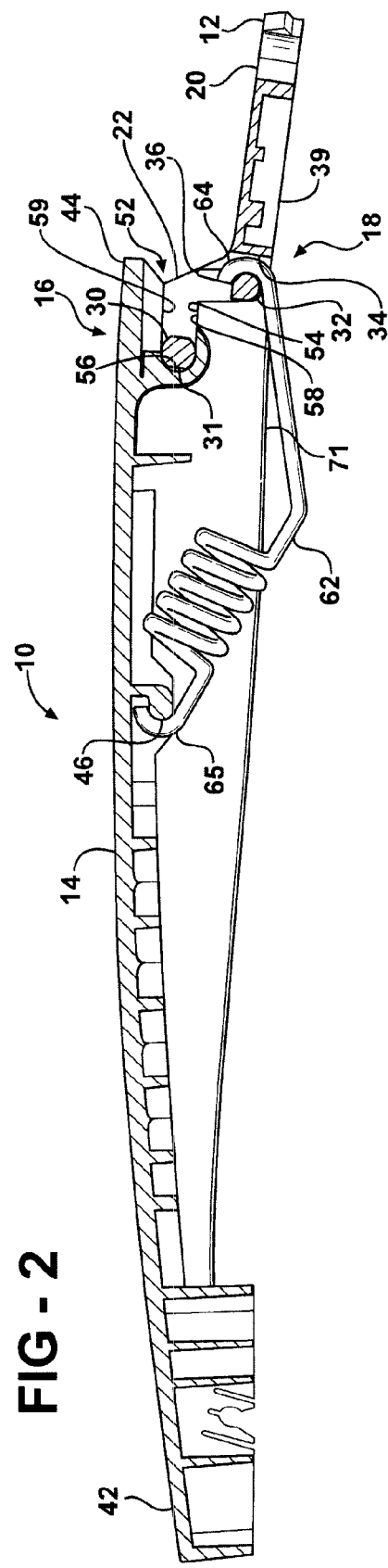

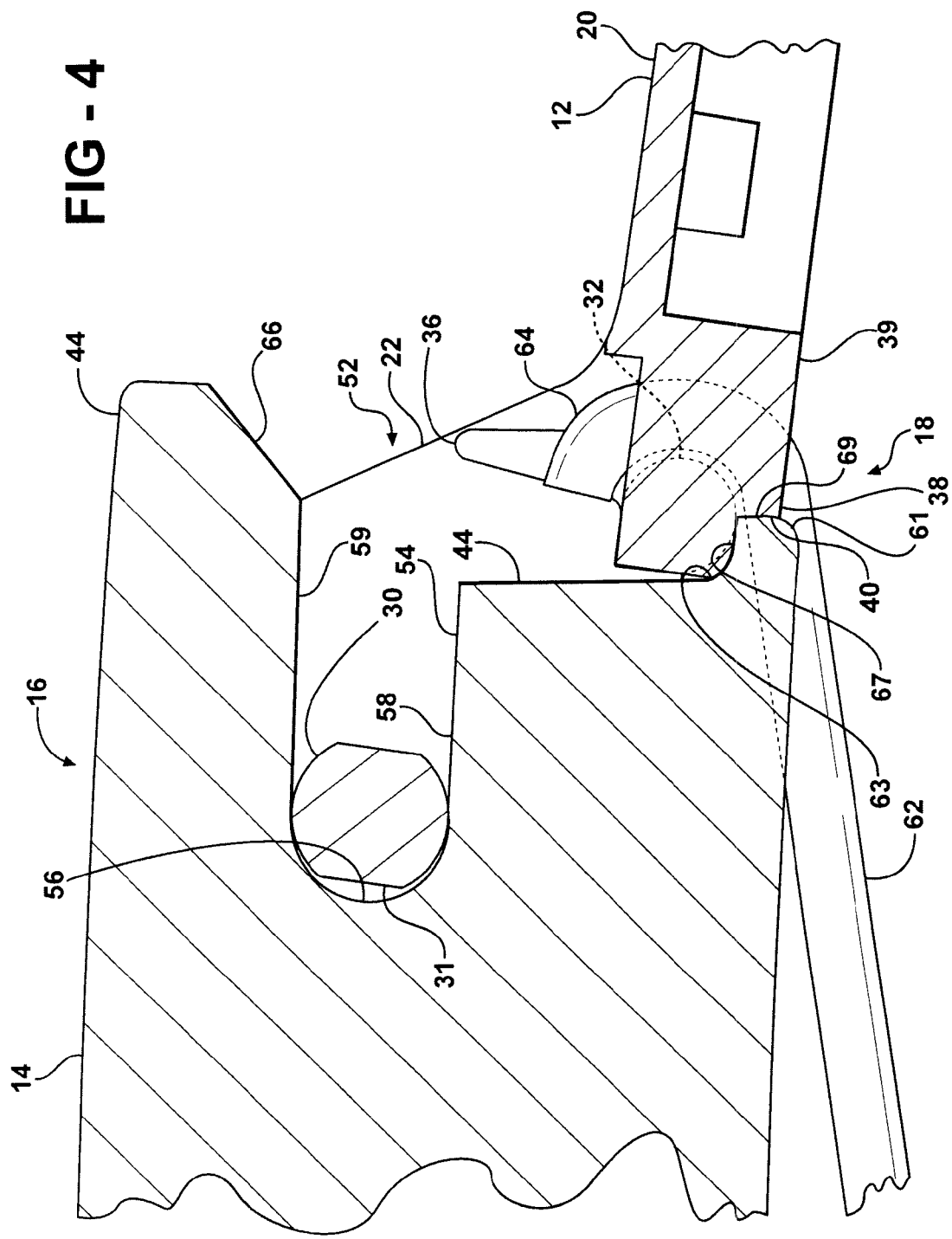

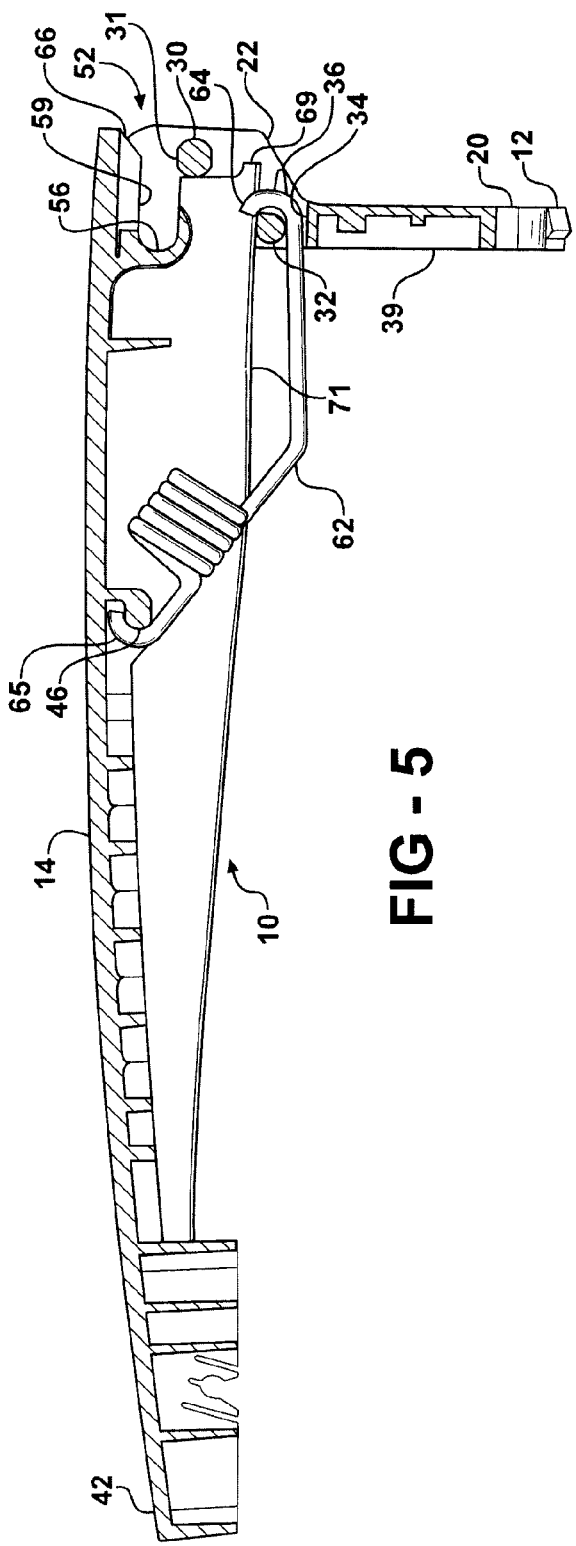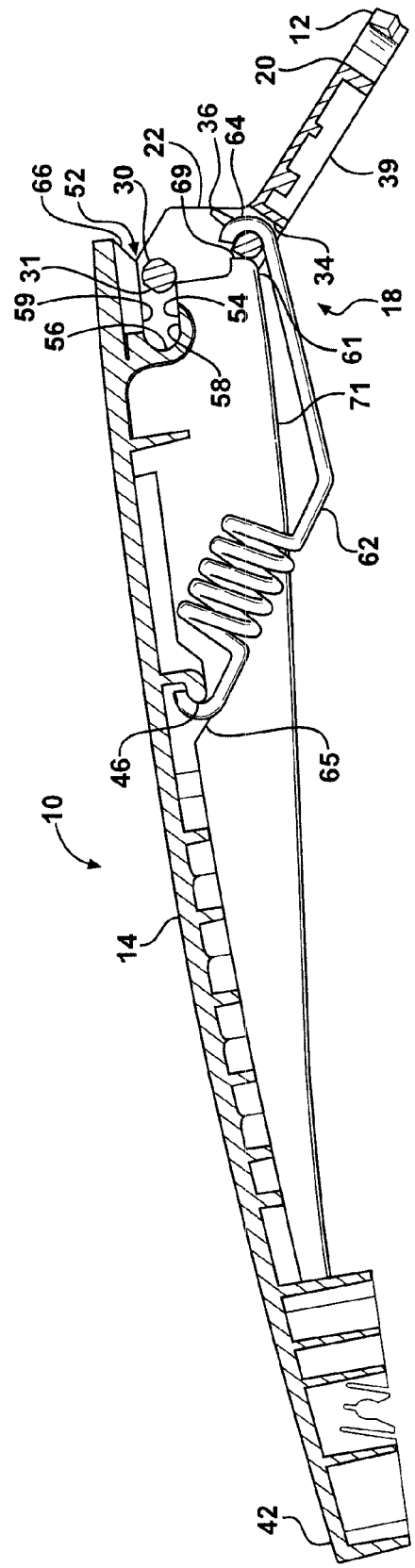

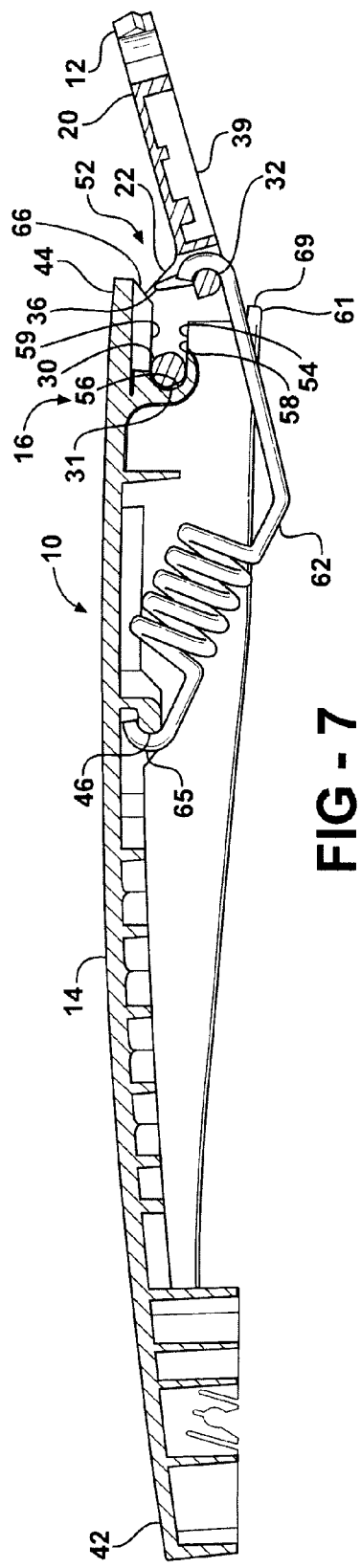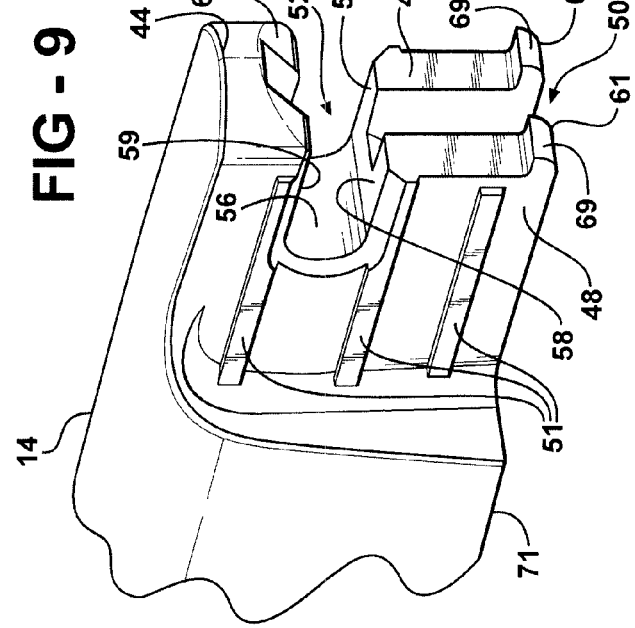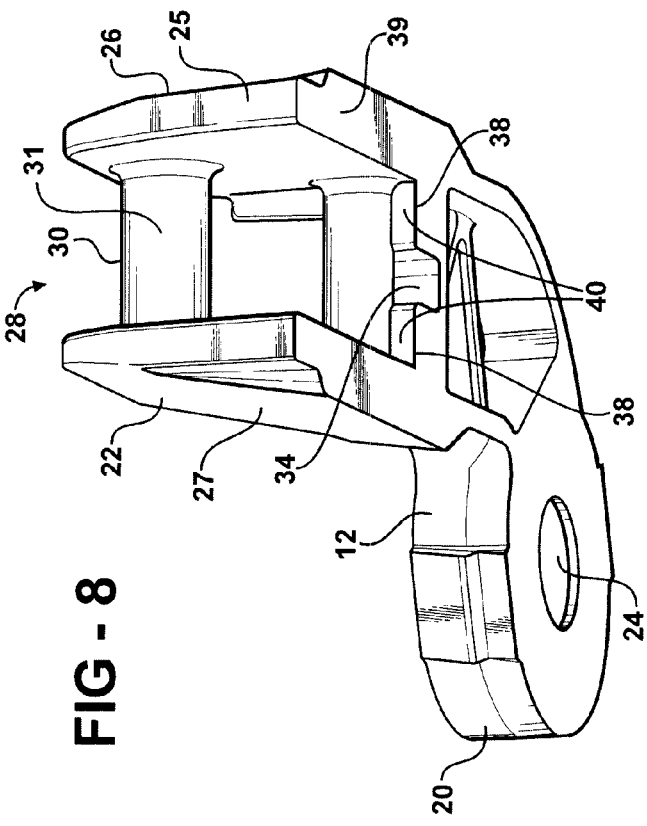

WIPER ARM ASSEMBLY HAVING LOCKING SURFACES

CROSS-REFERENCE TO RELATED APPLICATION

This application claims the benefit of U.S. Provisional Application Ser. No. 60/863,445, filed Oct. 30, 2006, which is incorporated herein by reference in its entirety.

BACKGROUND OF THE INVENTION

1. Technical Field

This invention relates generally to wiper arm assemblies for vehicles, and more particularly to wiper arm assemblies having a mounting head for attachment to a vehicle and a wiper arm attached for articulation relative to the mounting head, and methods of assembly thereof.

2. Related Art

Wiper arm assemblies for vehicles are known to have a wiper arm hinged for articulation relative to a mounting head. The mounting head facilitates attachment of the assembly to a surface on the vehicle so that a wiper blade attached to the wiper arm is suitably positioned for oscillation against a window. The wiper arm and wiper blade attached thereto can generally be articulated relative to the mounting head away from the window to a service-up position to facilitate replacing the wiper blade.

It is known to manufacture wiper arm assemblies with the mounting head and wiper arm permanently fixed to one another by a staked pin or rivet. In this type of construction, the pin or rivet is assembled between axially aligned openings in the mounting head and wiper arm, and then the pin or rivet is fixed therein to permanently couple the parts together sot that they can not be taken apart thereafter. At some point in assembly, one end of a coil spring is attached to the mounting head, and an opposite end of the coil spring is attached to the wiper arm. The force imparted by the coil spring maintains the wiper blade in wiping engagement with the window as the mounting head is oscillated by a drive motor. The spring also allows the wiper arm to be articulated away from the window by manually lifting the wiper arm, such that the wiper blade can be serviced, as necessary. Though this type of wiper arm assembly works well in use, it typically comes with increased cost in manufacturing and assembly due to the added cost associated with the pin or rivet and the processes for permanently fixing the mounting head and wiper arm together.

It is also known to manufacture wiper arm assemblies with the mounting head and wiper arm attached to one another such that they can be disassembled from one another after being assembled in a "preassembled" position. A preassembled position is defined when the mounting head and wiper arm are attached together, but not yet assembled to a vehicle. In one known construction, as disclosed in the prior art section of U.S. Pat. No. 6,553,608 (the '608 patent), the mounting head and wiper arm are attached together under a preload of a tension spring, with an axle on one of the parts being received to form a hinged connection in an open hub of the other part. Bearing surfaces on the mounting head and wiper arm are pulled into engagement with one another along a line of force imparted by the tension spring. The opposing reaction forces between the bearing surfaces act to maintain the mounting head and wiper arm in the preassembled position until the wiper arm assembly is fully assembled to a vehicle. Unfortunately, the bearing surfaces are not prevented from moving back toward a disassembled direction and can slide relative to one another under a minimal force, which can occur during transport or during careless handling, whereupon the mounting head and wiper arm can become inadvertently disassembled.

To combat the problem of inadvertent disassembly set out in the prior art section of the '608 patent, the '608 patent teaches forming the bearing surfaces as being arranged to define interacting camming surfaces. In order for the mounting head and wiper arm to be disassembled from their preassembled position, the bearing surfaces require the spring attaching the mounting head and the wiper arm to be increased in length, thus requiring an increased tensile force to be overcome prior to the parts becoming disassembled from one another. Upon the bearing surfaces overcoming a cam lobe, the point at which the tensile spring is at its greatest length, the length of the spring is allowed to decrease, thereby causing a tensile force imparted by the spring to disassemble the mounting head and the wiper arm from one another. Accordingly, the '608 patent teaches that the mounting head can still be disassembled from the wiper arm by rotating the wiper arm relative to the mounting head toward the disassembled direction with a sufficient torque to overcome the cam lobe.

SUMMARY OF THE INVENTION

A wiper arm assembly includes a mounting head having a first end with a bottom surface configured for mounting to a vehicle and a pair of laterally spaced sidewalls extending upwardly from the bottom surface to a second end with an axle extending between the sidewalls. The mounting head has a locking surface extending generally perpendicular to the bottom surface. A wiper arm extends along a longitudinal axis between a first end configured for operable attachment to a wiper blade and a second end having a hub with a pocket extending from an open end for receipt of the axle to a seating surface. The second end of the wiper arm has a protrusion extending outwardly in a direction generally opposite the first end of the wiper arm. The protrusion has a locking surface extending in a plane generally perpendicular to the longitudinal axis. A spring is arranged for operable attachment to the mounting head and the wiper arm. The locking surfaces of the mounting head and the wiper arm are configured to be brought into engagement with one another in a shipping position under a force imparted by the spring upon rotating the mounting head relative to the wiper arm from a disassembled position toward the shipping position. The locking surfaces confront each other in a plane generally perpendicular to the longitudinal axis while in the shipping position and prevent the mounting head and the wiper arm from rotating back toward the disassembled position from the shipping position.

Another aspect of the invention provides a method of constructing a wiper arm assembly. The method starts with providing a mounting head having a bottom surface for mounting to a vehicle with a locking surface extending generally perpendicular to the bottom surface and having a pair of laterally spaced sidewalls with an axle extending between the sidewalls. Further, providing a wiper arm having a longitudinal axis extending between a first end and a second end. The second end is provided having a hub with a pocket and a protrusion extending outwardly opposite the first end. The protrusion is provided having a locking surface extending in a plane generally perpendicular to the longitudinal axis. Then, operably attaching a spring to the mounting head and the wiper arm and rotating the mounting head and said wiper arm relative to one another to move the mounting head and the wiper arm from a disassembled position to a shipping position. The relative rotation between the mounting head and the wiper arm causes the axle to be received in the pocket and the locking surfaces of the mounting head and the wiper arm to be brought into engagement with one another under a tension force imparted by the spring. The locking surfaces are brought into confronting engagement with each other in a plane generally perpendicular to the longitudinal axis while in the shipping position, thereby preventing the mounting head and the wiper arm from rotating back toward the disassembled position from the shipping position.

Accordingly, a wiper arm assembly constructed in accordance with the invention, by way of example and without limitation, provides a wiper arm assembly that is easy to assemble, economical in manufacture, prevented from becoming inadvertently disassembled, and has a long and useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a side view of a wiper arm assembly constructed in accordance with one presently preferred embodiment of the invention shown in a shipping position;

FIG. 2 is a cross-sectional view taken generally along a central axis of the wiper arm assembly of FIG. 1;

FIG. 4 is a view similar to FIG. 3 showing a cross-section of the assembly along a line offset from the central axis;

FIG. 5 is a view similar to FIG. 2 while in a disassembled position;

FIG. 6 is a view similar to FIG. 2 while in a partially assembled position;

FIG. 7 is a view similar to FIG. 2 while in a service-up position;

FIG. 8 is a perspective view of a mounting head of the wiper arm assembly;

FIG. 9 is partial perspective view of a wiper arm of the wiper arm assembly;

DETAILED DESCRIPTION OF PRESENTLY PREFERRED EMBODIMENTS

Figure 3:
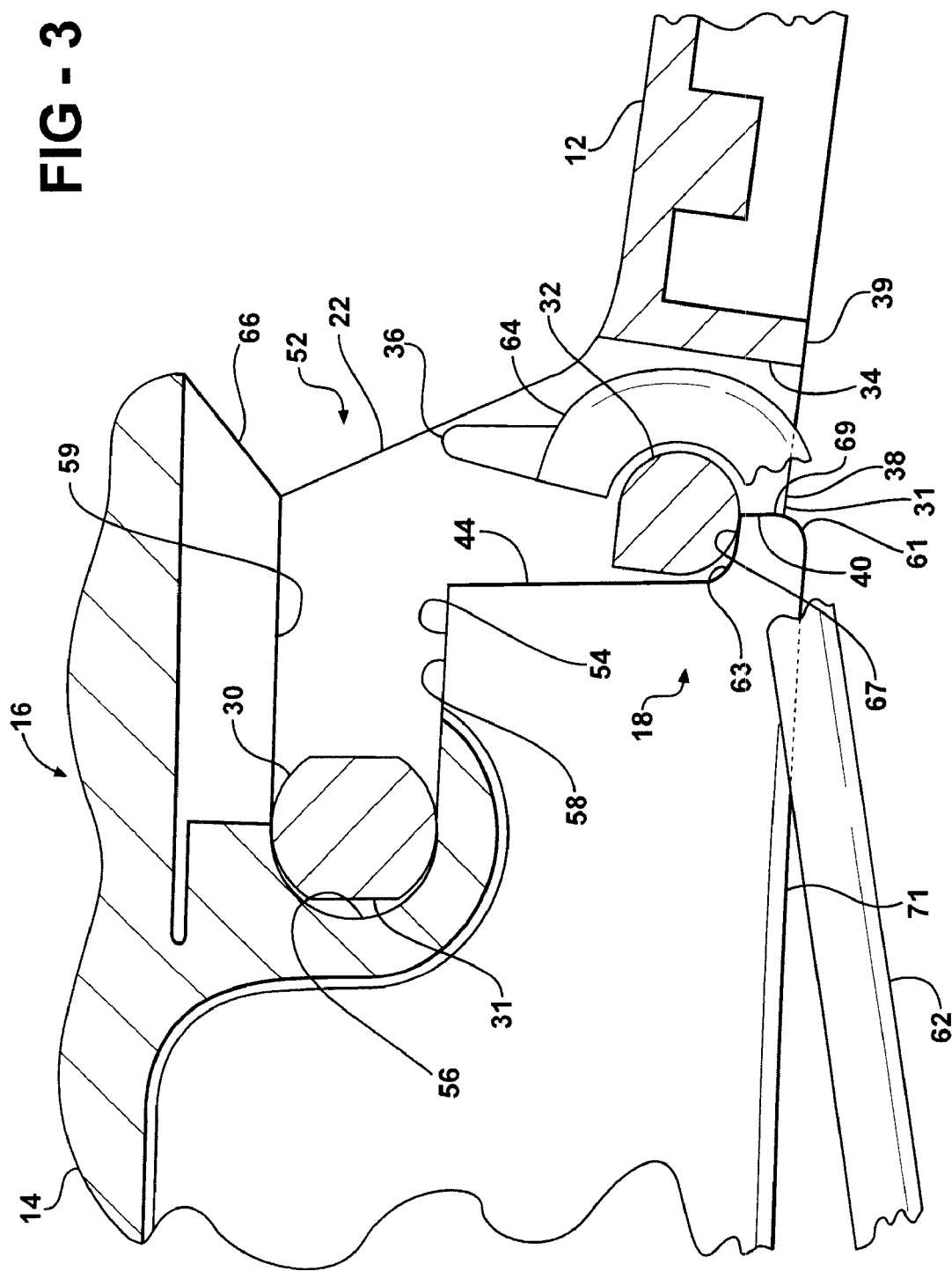
FIG. 3 is a enlarged partial view of FIG. 2 with a portion of a spring removed.

Referring in more detail to the drawings, FIGS. 1-2 and 5-7 show a wiper arm assembly 10 constructed according to one presently preferred embodiment of the invention. The wiper arm assembly 10 has a mounting head 12 to facilitate attachment of the assembly 10 to a vehicle, and a wiper arm 14 for operable attachment of a wiper blade (not shown) to the assembly 10. The wiper arm 14 is attached for articulated movement to the mounting head 12 via a hinged joint 16 so that the wiper arm 14 can be pivoted in use and during assembly to a vehicle between a preassembled position, referred to hereafter as a shipping position (FIG. 1), and a fully assembled position (not shown), wherein the assembly 10 is mounted to a vehicle. While in the shipping position, a locking mechanism 18 acts between the mounting head 12 and wiper arm 14 to prevent them from pivoting from the shipping position back toward a disassembled position (FIG. 5). Accordingly, the wiper arm assembly 10 is prevented from becoming inadvertently disassembled from the shipping position under a torque force, such as during shipping or while being handled prior to being attached to the vehicle.

As best shown in FIG. 8, the mounting head 12 has a mounting portion 20 adjacent a first end 23 and a hinge portion 22 adjacent a second end 25. The mounting portion 20 preferably has an opening 24 to facilitate attachment of the assembly 10 to the vehicle via a standard fastener. The hinge portion 22 is adjacent the end 25 opposite the opening 24, and is adapted to allow the wiper arm 14 to articulate relative to the mounting head 12. The mounting head 12 has a pair of laterally spaced sidewalls 26, 27 defining a generally open channel 28 therebetween. An axle 30 of a predetermined diameter extends between the sidewalls 26, 27. The axle 30 preferably defines a generally cylindrical bearing surface 31 facing the end 25 and being spaced a predetermined distance from the end 25. The mounting head 12 has a spring attachment member, represented here, by way of example and without limitations, as a spring pin 32 extending between the sidewalls 26, 27. To further define the attachment member, a through opening 34 is preferably formed adjacent the spring pin 32. The spring pin 32 is located generally between the axle 30 and the mounting portion 20. The mounting head 12 preferably has at least one, and shown here as a pair of stop surfaces 36 (FIGS. 2-7) arranged to limit the degree of pivot of the wiper arm 14 upwardly from the mounting head 12, from the fully assembled position while on the vehicle to the service-up position (FIG. 7). It should be recognized that the degree of movement between the assembled position and the service-up position can be varied, as desired, by altering the stop surfaces 36.

As best shown in FIGS. 3, 4 and 8, the locking mechanism 18 is defined in part on the mounting head 12 by a locking member 38. The locking member 38 is represented here as extending generally between the sidewalls 26, 27 and from the axle 30 downwardly toward a bottom mounting surface 39 of the mounting head 12. It should be recognized that the locking member 38 could be separate and detached from the axle 30, if desired. The locking member 38 has a locking surface or surfaces 40, shown here, by way of example and without limitations, as being generally flat and extending generally perpendicular to the bottom mounting surface 39. The locking surfaces 40 are interrupted by the through opening 34, but otherwise extend between the sidewalls 26, 27.

As best shown in FIGS. 1-2 and 5-7, the wiper arm 14 has an elongate body extending between opposite ends 42, 44 generally along a longitudinal axis 43, with one end 42, for example, being adapted for attachment of the wiper blade, and the other end 44 being arranged for pivotal attachment to the mounting head 12. To facilitate attachment to the mounting head 12, the wiper arm 14 has a spring attachment feature, shown here as a spring hook 46, attached to a bottom surface of the wiper arm 14, and preferably formed as one piece therewith. As shown in FIG. 9, the end 44 has a pair of sidewalls 48, 49 laterally spaced from one another by a centrally extending spring channel 50. The sidewalls 48, 49 have outer surfaces arranged for close receipt between the sidewalls 26, 27 of the mounting head 12 and within the hinge portion 22. Preferably, to minimize friction in use, the sidewalls 48, 49 have protrusions, shown here by way of example and without limitations, as a plurality of ribs 51 (FIG. 9), extending outwardly therefrom and extending substantially parallel to the longitudinal axis 43 along the length of the sidewalls 48, 49. The end 44 has a hub 52, preferably formed as a monolithic piece of material with the wiper arm 14, although it could be formed as a separate piece and attached thereafter. The hub 52 is defined at least in part by a pocket 54 extending into the end 44 a predetermined distance to a seating surface 56. The seating surface 56 is preferably cylindrical to conform generally to the generally cylindrical bearing surface 31 on the axle 30. As best shown in FIGS. 3 and 4, the pocket 54 is defined in part by opposite lower and upper walls 58, 59, respectively, preferably spaced from one another for close receipt of the axle 30, such that the axle 30 can oscillate within the pocket 54. The lower and upper walls 58, 59 are shown here, for example, as being parallel to one another.

As best shown in FIGS. 3-7, and 9, the sidewalls 48, 49 have protrusions 61 extending axially outwardly from the end 44 adjacent a bottom surface 71 of the wiper arm 14. The protrusions 61 are represented here, by way of example and without limitations, as having arcuate fillets 63 transitioning a front wall 67 to the end 44. The front walls 67 extend a predetermined distance axially and terminate at free ends, referred to hereafter as locking surfaces 69. The locking surfaces 69 are generally flat and extend generally perpendicular to the longitudinal central axis of the wiper arm 14 for abutting locking engagement with the locking surfaces 40 on the mounting head 12 while the assembly 10 is in the shipping position.

To assemble the mounting head 12 to the wiper arm 14, a spring, shown here as a coil spring 62, is tensioned between the mounting head 12 and the wiper arm 14. The coil spring 62 has hooked, generally c-shaped opposite ends 64, 65, with one end 64 being attached to the spring pin 32 of the mounting head 12 and the other end 65 being attached to the spring hook 46 of the wiper arm 14. Upon attaching the coil spring 62, the wiper arm assembly 10 is in its disassembled position (FIG. 5). While in the disassembled position, the wiper arm assembly 10 is able to readily fall apart. The axle 30 is in abutting contact with the end 44 of the wiper arm 14 adjacent the pocket 54 of the hub 52.

To proceed in assembly, the mounting head 12 and wiper arm 14 are rotated relative to one another, with the mounting head 12 moving counter clockwise, as viewed in FIG. 6, wherein the mounting head 12 and wiper arm 14 are shown in a partially assembled position. In this position, the axle 30 begins to enter the pocket 54 while the spring pin 32 and locking surfaces 40 extending therefrom move conjointly with the axle 30 over the protrusions 61. In the partially assembled position, the coil spring 62 is increased in length from that of the disassembled position, thus, increasing the tension force in the spring 62. The mounting head 12 and wiper arm 14 are rotated further during assembly wherein the axle 30 is received in the pocket 54 so that the tension imparted by the coil spring 62 pulls the axle 30 toward the seating surface 56 of the hub 52.

As best shown in FIGS. 3 and 4, as the axle 30 is pulled into engagement with the seating surface 56, the locking surfaces 40 of the mounting head locking member 38 are pulled into engagement with locking surfaces 69 on the protrusions 61. When the respective locking surfaces 40, 69 are in confronting relation with one another, the spring pin 32 preferably remains slightly spaced from the end 44 of the wiper arm 14. The locking surfaces 40, 69 remain engaged with one another while in the shipping position (FIGS. 2-4) and the axle 30 remains captured between the walls 58, 59 of the pocket 54 and preferably engaged with the seating surface 56, all under the biasing tension of the spring 62. If the assembly 10 is to be disassembled, translation of the mounting head 12 relative to the wiper arm 14 is required to clear the respective locking surfaces 40, 69 from engagement with one another. As such, a linear force sufficient to overcome the tensile force imparted by the spring 62 must be applied between the mounting head 12 and the wiper arm 14 to translate the axle 30 outwardly from the pocket 54 and to clear the locking surfaces 40, 69 from locked engagement with one another. Accordingly, once in the shipping position, the wiper arm assembly 10 is locked against disassembly via relative rotation of the wiper arm 14 and mounting head 12, and thus, the assembly 10 is assured of not becoming inadvertently disassembled.

While in the shipping position, the locking member, the wiper arm 14 is able to be pivoted upwardly from a fully assembled position while mounted on the vehicle to the service-up position (FIG. 7). While in the service-up position, the stop surfaces 36 engage an abutment surface 66 on the wiper arm 14 to limit the pivoting movement of the wiper arm 14 relative to the mounting head 12, while the bearing surface 31 of the axle 30 preferably remains seated against the seating surface 56 of the hub 52. Accordingly, the locking member 38 is preferably slightly spaced from the upper wall 59 of the pocket 54 while in the service-up position. Of course, if desired, the locking member 38 could be arranged to engage the upper wall 59 to define the service-up position.

Figure 10:
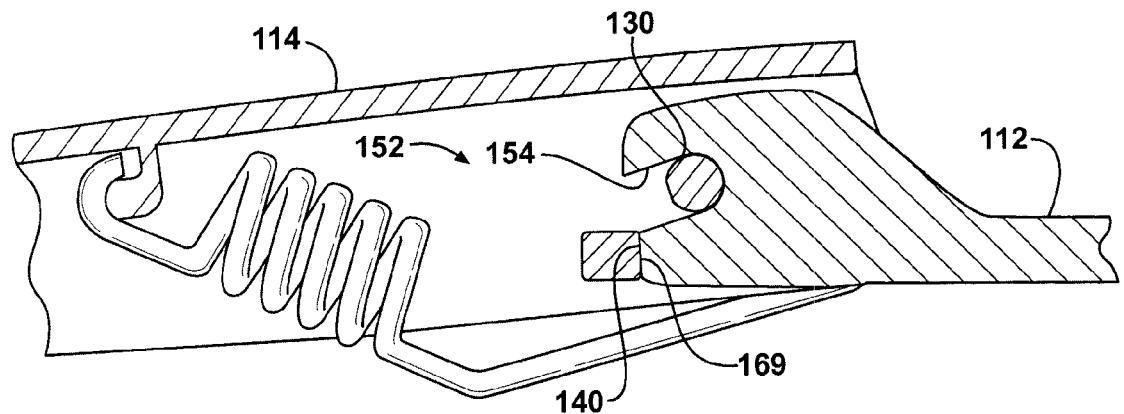
FIG. 10 is a partial cross-sectional view of a wiper arm assembly constructed in accordance with another embodiment of the invention.
Figure 11:
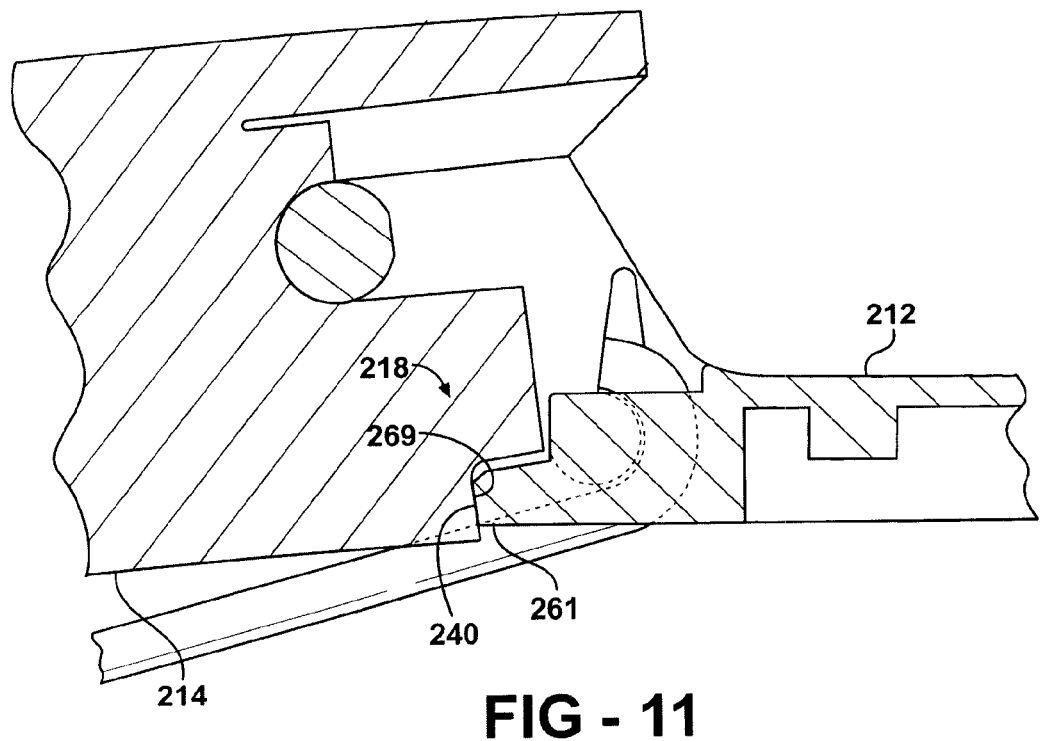
FIG. 11 is a partial cross-sectional view of a wiper arm assembly constructed in accordance with yet another embodiment of the invention.

Obviously, many modifications and variations of the present invention are possible in light of the above teachings. For example, as shown in FIG. 10, it should be recognized that the axle 30 and the hub 52 could be constructed in the reverse orientation. Accordingly, an axle 130 could be attached to a wiper arm 114, and a hub 152 could be formed or attached on a mounting head 112. A pocket 154 is formed in the hub 152 similarly as described above, however, it preferably extends in an inclined relation to the central axis of the assembly to facilitate the locking engagement between the mounting head 112 and the wiper arm 114 while in the shipping position. As above, the hub 152 has a locking surface 140 arranged to confront another locking surface 169 on the wiper arm 114, such that the locking surfaces 140, 169 prevent the mounting head 112 from rotating relative to the wiper arm 114 toward the disassembled position. As such, the mounting head 112 and the wiper are 114 are locked against disassembly. Similarly, as shown in FIG. 11, the structure of the locking mechanism 18 could be reversed. Accordingly, a locking mechanism 218 can have a protrusion or protrusions 261 with associated locking surfaces 240 attached to a mounting head 212, and a locking surface 269 could be formed or attached on a wiper arm 214. It is, therefore, to be understood that within the scope of the appended claims, and any other claims allowed which stem from this application, that the invention may be practiced otherwise than as specifically described and shown.

What is claimed is:

1. A wiper arm assembly, comprising:
a mounting head having a first end with a bottom surface configured for mounting to a vehicle and a pair of laterally spaced sidewalls extending upwardly from the bottom surface to a second end with an axle extending between said sidewalls, said mounting head having a flat locking surface extending along a plane generally perpendicular to said bottom surface;
a wiper arm extending along a longitudinal axis between a first end configured for operable attachment to a wiper blade and a second end having a hub with a pocket extending from an open end for receipt of said axle to a seating surface, said second end of said wiper arm having a protrusion extending outwardly in a direction generally opposite said first end of said wiper arm, said protrusion having a flat locking surface extending along a plane generally perpendicular to said longitudinal axis;

a spring arranged for operable attachment to said mounting head and said wiper arm;

wherein said flat locking surfaces of said mounting head and said wiper arm are configured to be brought into engagement with one another in a shipping position under a force imparted by said spring upon rotating said mounting head relative to said wiper arm from a disassembled position toward said shipping position, said locking surfaces confronting each other in a plane generally perpendicular to said longitudinal axis while in said shipping position and preventing said mounting head and said wiper arm from rotating back toward said disassembled position from said shipping position; and said mounting head having a spring attachment member extending between said sidewalls with said spring being attached to said spring attachment member, wherein said locking surface of said mounting head extends downwardly from said spring attachment member to said bottom surface.

2. The wiper arm assembly of claim 1 wherein said locking surface of said wiper arm provides a free end of said hub.

3. The wiper arm assembly of claim 1 wherein said axle engages said seating surface of said pocket while in said shipping position.

4. The wiper arm assembly of claim 1 wherein said hub has opposite sidewalls with protrusions extending outwardly therefrom for receipt between said sidewalls of said mounting head.

5. The wiper arm assembly of claim 4 wherein said protrusions are provided as a plurality of elongate ribs.

6. The wiper arm assembly of claim 5 wherein said ribs extends substantially parallel to said longitudinal axis of said wiper arm.

* * * * *